(12) United States Patent
Broaddus (10) Patent No.: US 11,546,560 B2
(45) Date of Patent: *Jan. 3, 2023

(54) BLOCKCHAIN-BASED TRUSTLESS DATE VERIFIABLE VIDEO CAPTURE

(71) Applicant: Daniel Hugh Broaddus, Evanston, IL (US)

(72) Inventor: Daniel Hugh Broaddus, Evanston, IL (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/357,789

(22) Filed: Jun. 24, 2021

(65) Prior Publication Data
US 2021/0321064 A1 Oct. 14, 2021

Related U.S. Application Data

(63) Continuation of application No. 16/403,611, filed on May 5, 2019, now Pat. No. 11,076,135.

(60) Provisional application No. 62/667,545, filed on May 6, 2018.

(51) Int. Cl.
*H04N 7/18* (2006.01)
*H04L 9/32* (2006.01)

(52) U.S. Cl.
CPC .......... *H04N 7/188* (2013.01); *H04L 9/3271* (2013.01)

(58) Field of Classification Search
CPC ........ H04N 7/188; H04N 7/18; H04L 9/3271; H04L 2209/56; H04L 2209/38; H04L 9/3239
See application file for complete search history.

(56) References Cited

U.S. PATENT DOCUMENTS

| | | |
|---|---|---|
| 2015/0156026 A1 | 11/2015 | Gault et al. |
| 2017/0161382 A1 | 6/2017 | Ouimet et al. |
| 2019/0166101 A1 | 5/2019 | Ramos et al. |
| 2019/0303854 A1 | 10/2019 | O'Brien et al. |

OTHER PUBLICATIONS

Protocol design—How to fairly select a random number for a game without trusting a third party?, Cryptography Stack Exchange, https://crypto.stackexchange.com/questions/767/how-to-fairly-select-a-random-number-for-a-game-without-trusting-a-third-party, Sep. 2011, accessed May 3, 2019.
Blockchain—Is there a way to use the block chain as entropy in random number generator?, Bitcoin Stack Exchange, https://bitcoin.stackexchange.com/questions/53/is-there-a-way-to-use-the-block-chain-as-entropy-in-random-number-generator/1113#1113, Aug. 2011, accessed May 3, 2019.

*Primary Examiner* — Jared Walker
(74) *Attorney, Agent, or Firm* — Daniel H. Broaddus (57) ABSTRACT

A host system may initiate a multiple node exchange of selected values to generate a random selection. The structure of the exchange may allow later verification that no single node had control of the generation of the random selection. Accordingly, the random selection may be unknown prior to the exchange. The host system may then provide the random selection to the device for integration of the random selection during the capture of video. The video may be recorded to a blockchain. Because of the integration with the random selection, the video may be date verifiable, such that the video can be verified to be created after the random selection and before recordation to the blockchain.

20 Claims, 4 Drawing Sheets

BLOCKCHAIN-BASED TRUSTLESS DATE VERIFIABLE VIDEO CAPTURE

PRIORITY CLAIM

This application is a continuation of and claims priority to U.S. patent application Ser. No. 16/403,611, filed May 5, 2019, and titled Blockchain-Based Trustless Date Verifiable Video Capture, which is incorporated by reference in its entirety. U.S. patent application Ser. No. 16/403,611 claims priority to U.S. Provisional Patent Application Ser. No. 62/667,545, filed May 6, 2018, and titled Blockchain-Based Trustless Date Verifiable Video Capture, which is incorporated by reference in its entirety.

TECHNICAL FIELD

This disclosure relates to date verifiable file creation.

BACKGROUND

Rapid advances in electronics and communication technologies, driven by immense customer demand, have resulted in the widespread adoption of electronic transactions, record keeping, and data sharing. As one example, e-currencies, such as Bitcoin, have displaced paper currencies in millions of transactions per year. Improvements in tracking and/or knowledge management attached to such electronic transactions will continue to increase the features and options available to operators engaging in electronic transactions and electronic record keeping.

Landlords and tenants do not generally involve trusted-parties until a dispute arises. This adds complexity and expense to achieving resolution because trusted parties must often rely on the evidence provided by and the recollections of the distrusted parties to establishing the factual basis for resolution of their dispute.

Herein, distributed networks and cryptographic structures/primitives ("crypto"), including blockchain and other distributed ledger technologies, provide a technical solution for supplanting socially created trust constructs. Accordingly, distributed networks and crypto transform a historically social problem with social solutions into a purely technical problem with technical solutions. Further, because technical solutions eschew the need for third-party involvement, untrusted parties may collect trustable evidence cheaply enough justify its collection without an active or imminent dispute. Therefore, distributed networks and crypto can provide an underpinning for business and legal models that rely on pre-dispute fact gathering by untrusted parties. Using the architectures and techniques discussed below, crypto may provide date verifiability to media files, data where a random number may be integrated into the creation of the data, and data where random selection of the data from multiple options may be used to certify its selection at a time after generation of a random value. For the architectures and techniques discussed various blockchain and other distributed ledger technologies may provide suitable recordation features (e.g., functional immutability, time stamping or other time keeping features, or other features). For convenience, these various blockchain and other distributed ledger technologies will be referred to collectively as "blockchain."

The video capture techniques and architectures are discussed within the landlord-tenant property self-inspection context. However, these date-verifiable video capture techniques and architectures have application in other areas of law and industrial settings. For example, in regulatory inspection regimes, such as, EPA, USDA, and FDA site inspections, the schedule for on-site inspections is notoriously insufficient. Earliest-date-verifiable video capture paired with latest-date-verifiable blockchain recordation would provide the potential to supplement these sparse regulatory inspection schedules.

The video capture (VC) app captures the video in a manner that allows for independent verification that the video was not captured earlier than claimed. Further, the VC app provides of record of the video for blockchain storage thus allowing for independent verification that the video was not captured later than claimed. Accordingly, the host system can review video for signs of damage or disrepair within the property while confident that the video reflects the current condition of the property.

Further, the data verifiability techniques may be applied in contexts other than video capture, including audio capture, cryptographic challenge/key selection (e.g., for provable storage, financial exchanges, time-lock creation, or other cryptographic technique).

Earliest-Date-Verifiable Video Capture

The technique of earliest-date-verifiable (EDV) video capture includes date-verifiable random selection and integration of the random selection into the captured video. Date-verifiable random selection is a cryptographic technique for selecting a random value for which the random selection can be verified to have occurred at a specific date and time. Accordingly, integration of the random value into serves as proof that the video was created after the random selection.

Date-Verifiable Random Selection

Underlying the date-verifiability of the random selection is the use of a distributed network in the selection of the date-verifiable random value. Multiple nodes of the in the network select values. Those values are then combined in one of variety algorithms to produce a randomly selected value which is provably not under control of any one of the nodes. Accordingly, less than 100% of the nodes are surreptitiously coordinating, none of the individual nodes or any subgroup of the nodes would have foreknowledge of the final random value. Accordingly, any action (e.g., including file creation, video capture, data/challenge selection from a selected number of predetermined options, or other actions) that provable relies on that random value may be established as occurring after selection of the random value.

Table 1 shows one such date-verifiable random selection construction:

TABLE 1

Date-verifiable random selection construction

1. Each node x in the group selects a secret value $s_x$ secret value and then reveals $H(s_x)$, where H is a collision-resistant hash function, verifiable random function, or other function with both irreversibility and collision-resistance. H may be selected to produce values of a bit length.

TABLE 1-continued

Date-verifiable random selection construction

2. Once all $H(s_x)$ have been revealed, each node reveals $s_x$.
3. The values $s_x$ are concatenated (or otherwise combined) and then fed into H to produce Y. A first record of Y, the values $s_x$, and identifiers for the node participants is appended to a blockchain for later date verification.
4. Each node then selects a new secret value $t_x$ and reveals $H(Y \| t_x)$, where $\|$ denotes concatenation.
5. Once all $H(Y \| t_x)$ have been revealed, each node reveals $t_x$.
6. The values $t_x$ are concatenated along with Y and then fed into H to produce Z, which is the selected random value. A second record of Z and the values $t_x$, may be appended to the blockchain and may refer to the first record.

Other distributed-network based random selection schemes may be adapted to this purpose. The distributed-network based random selection schemes may be constructed such that the participating nodes commit to a selection while having less than full knowledge of the other selections. This may prevent a malicious node from selecting a value that will produce a result known to that node either before the selection process began or before the final value is learned by the other nodes (e.g., a head start). This may be achieved in one or more selection rounds. In some cases, more rounds may increase the difficulty of influencing the final random selection. Conversely, increased rounds may increase the resources consumed during generation of the random selection and reduce efficiency. However, the above algorithm in Table 1 establishes that date-verifiable random selection is achievable.

Random Variable Integration in Video Capture

Once a date-verifiable random value is selected, the date-verifiable random value is provided to the tenant for use in video capture. By creating and/or causing audio and visual signals during video capture, the selected random value is integrated into the self-inspection video. For example, in a mobile device based system, the VC app (e.g., provided by the host system) may cause the flash of the mobile device to turn on an off during filming to represent the random variable. An example, camera-flash-based implementation is discussed briefly below. Other implementations may include displaying words or strings of numbers for the operator of the mobile device to read aloud while filming. The system may also integrate a one or more watermarks into the video, for example a sequence of watermarks that represents the random selection. Virtually, any series of audio or visual signals may be used to represent the random value, for example, a series of flash cards displayed by the operator during filming, a programmable or network-connect semaphore/strobe, a specific order in which particular sites within the property are presented in the video, or other audio/visual sequence generator. Further, the representations may be mixed, for example a first group of bits from the random value selections may define the order in which sites (e.g., with pre-defined identifiers) are visited within the self-inspection video while a second group of bits defines a set of words to be vocalized by the operator (or another person present) during capture.

In an example flash-based system, the mobile device may use pairs of short flashes at defined relative intervals. For example, a host system may send the mobile device a series of time intervals based on the date verifiable random value selection. During filming, the mobile device may generate one pair of flashes every 10 seconds (or other pre-defined period). The time duration between the each pair of flashes may match up with the intervals in the series. For 30 fps video, an interval precision of 0.1 seconds may be used to avoid data loss due to sampling issues. Other flash sequences or larger tuples of flashes (e.g., triplets or quadruplets instead of pairs) may be used to represent the random value.

The result of the integration of the random variable is a video that records the self-inspection of the property that could not have been created before the random variable is selected. In other words, an EDV video.

Blockchain Recordation

Once the EDV video is created, the mobile app may send the EDV video to the host system and the host system may record the EDV to a blockchain. The record of the EDV video on the blockchain creates a latest date at which the EDV video could have been created. When blockchain recordation is paired with EDV capture, it is later verifiable that the self-inspection video occurred within the time window between the selection of the random value and the recordation of the self-inspection video on the blockchain.

In some implementations, the system may enforce an expiry date on random value selections. Expiry dates may add additional protection against the production of fraudulent self-inspection videos using deceptive post-capture editing or computer-generated effects.

For privacy and storage efficiency, the captured video may be recorded to the blockchain in a hashed, provable retrievability, or other crypto form. The host system and/or the tenant may then store the self-inspection video using locally-controlled storage. Then, using the blockchain record, the host/tenant could prove that the version of the video they have stored is the originally recorded self-inspection video.

Figure 1:
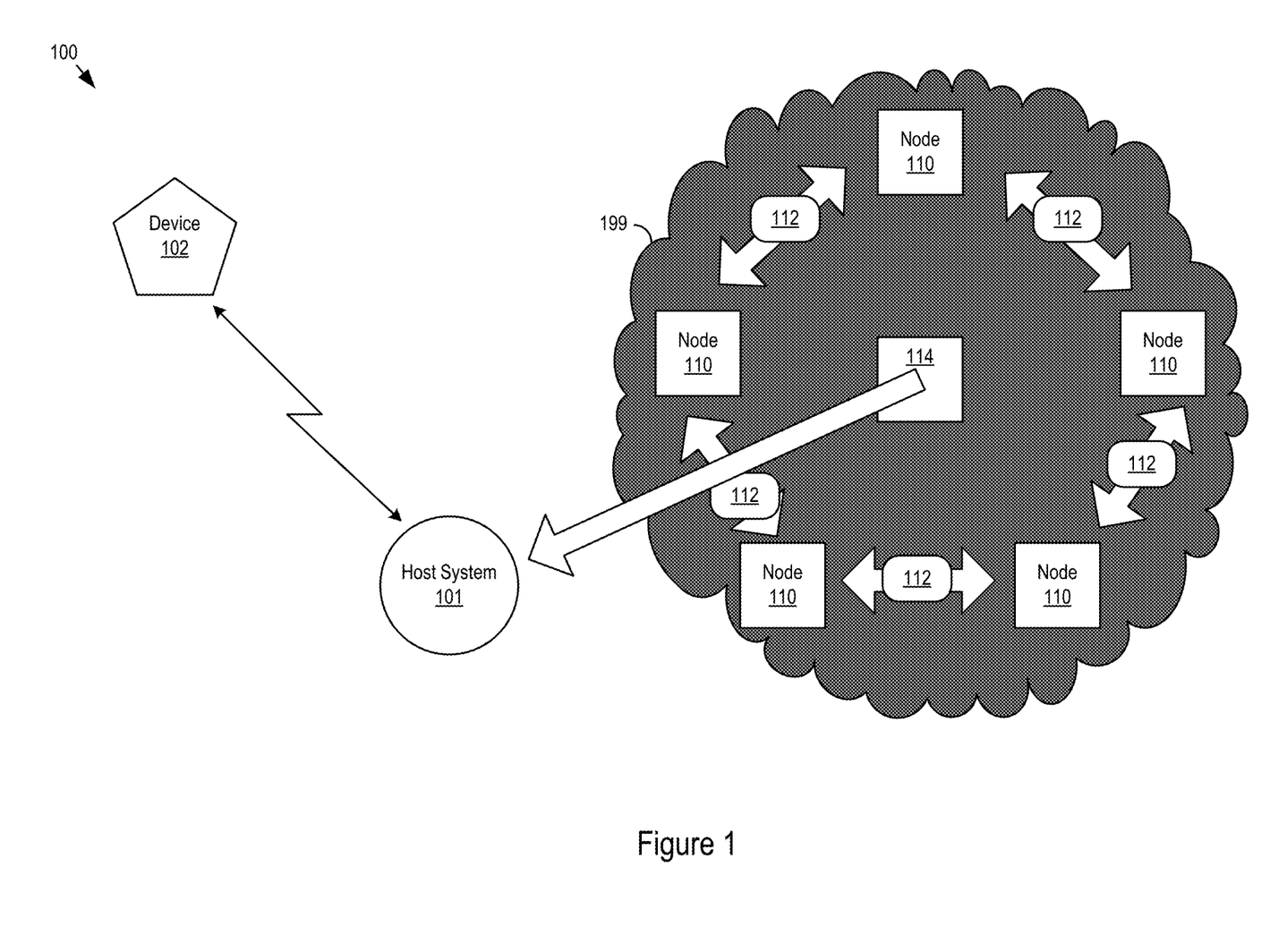
FIG. 1 shows and example date verifiable file creation environment.
Figure 2:
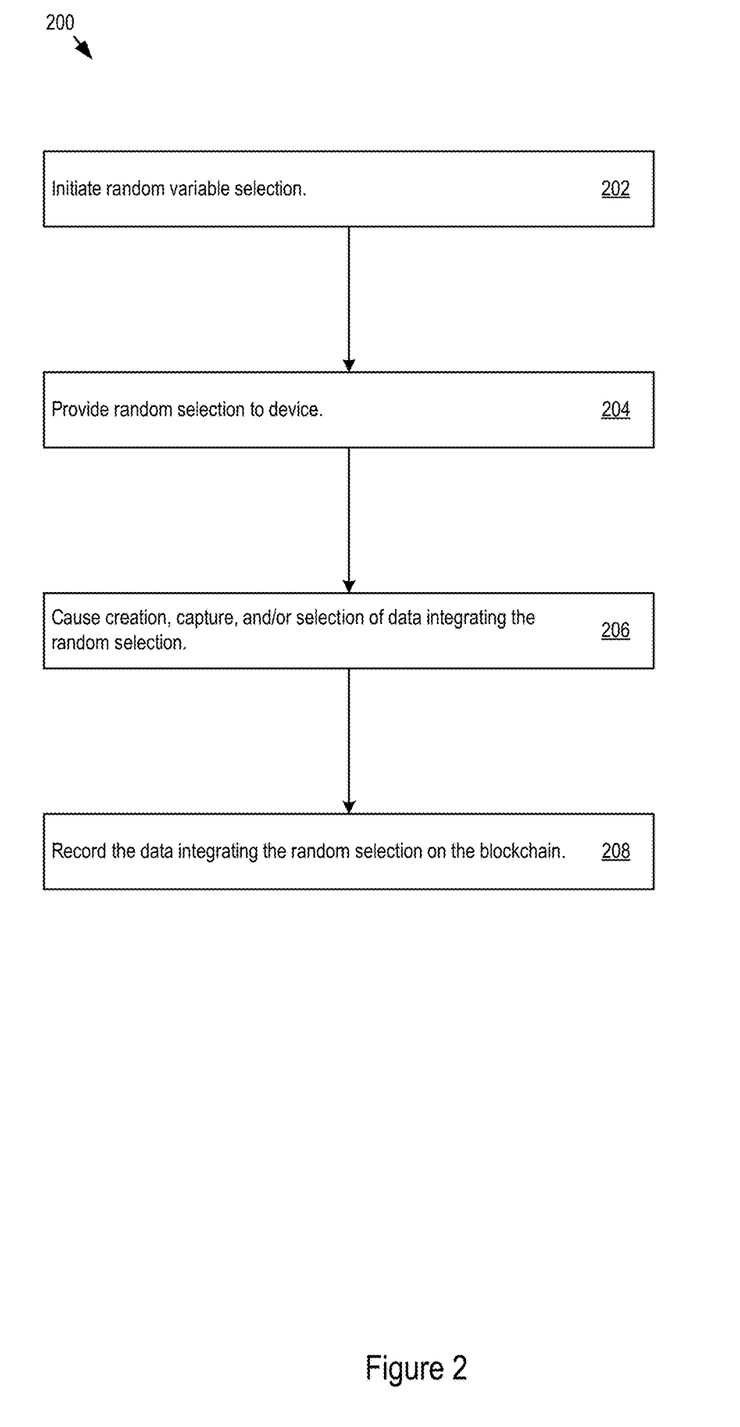
FIG. 2 shows example dating logic.

Referring now to FIGS. 1 and 2, FIG. 1 shows and example date verifiable file creation environment 100, and FIG. 2 shows example dating logic 200 (e.g., which may be executed on dating circuitry on the host system 101) that may be used for date verifiable file creation within the environment 100 A host system 101 (which may be distributed as discussed below) may be in communication with a device 102. The host system 101 may further be in communication with nodes 110 a distributed network 199 (and/or may be executing on those nodes). The host system 101 may initiate a random variable selection on the nodes (202). The nodes 110 may exchange selected values 112 (e.g., sometimes in an encrypted form prior to a later reveal). Based on the multiple node exchange, the nodes 110 may generate a random selection 114. For example, each of the multiple nodes may generate one or more selected values in one or more exchange rounds. In some cases, the individual results of the rounds may be recorded on the blockchain (either as a group, e.g., on a block or over multiple blocks fulfilling recordation request; or individually across multiple different recordation requests which may be fulfilled over one or more blocks). The host system 101 may provide the random selection 114 to the device 102 (204), which may capture video, select data, and/or obtain other data integrating the random selection in response (206). For example, to capture video integrating the random selection, the device 102 may cause a perceptible representation of the random selection which may be captured along with the content of the video for date verifiability. After capture or at intervals within the capture, the device 102 may upload the captured video to the host system 101 or to a distributed network. The host system 101 may cause the nodes of the distributed network to generate a record of the captured video on the blockchain (208).

The above techniques provide a platform on which video evidence with precise date verifiability can be created within a trustless system. The date verifiable may be used to credibility established the condition of a property at a particular date. Further, the low cost trustless self-inspection regime allows the collection of credible dispute resolution evidence prior to a specific dispute arising.

Figure 3:
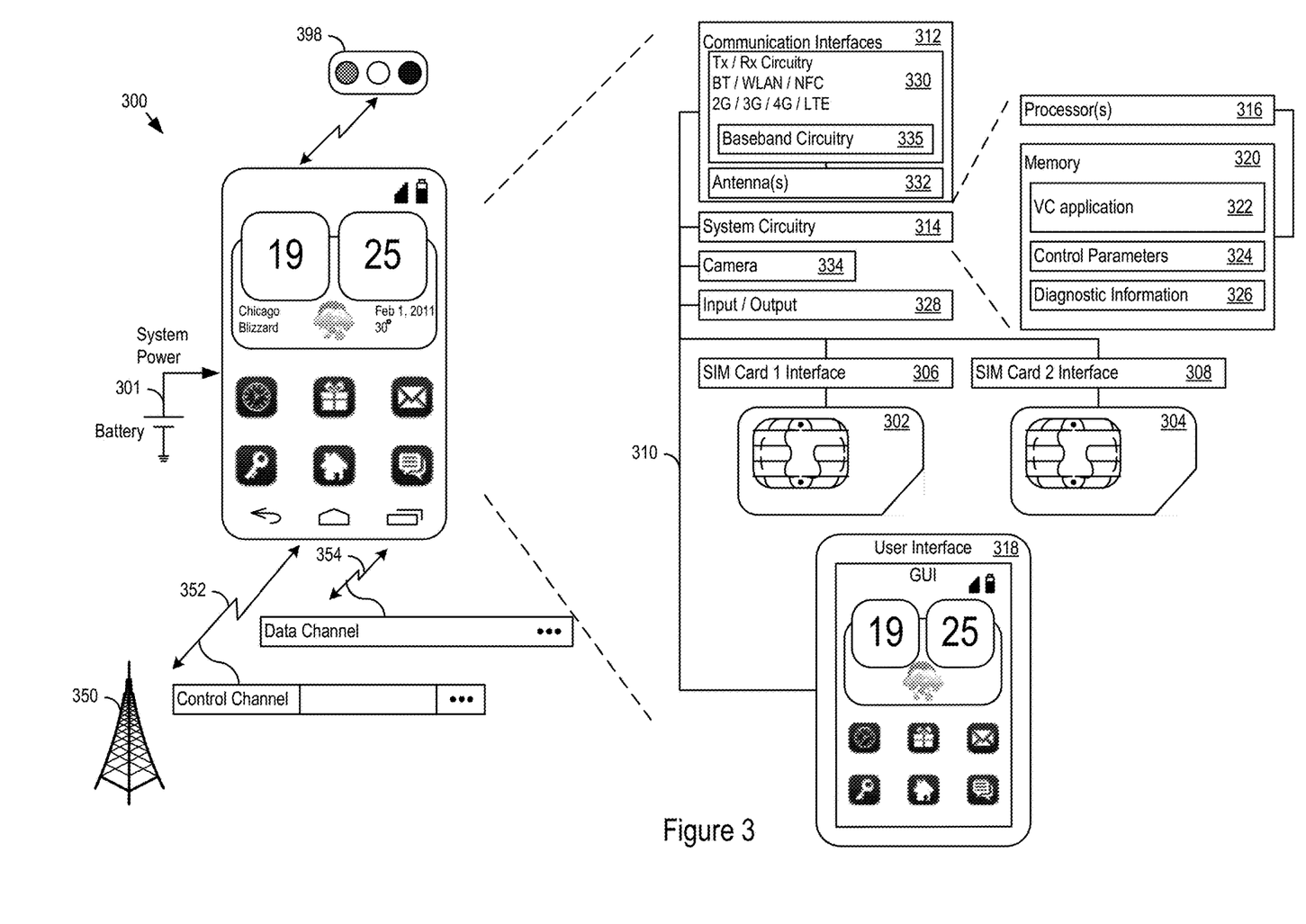
FIG. 3 shows an example mobile device.

FIG. 3 shows an example mobile device 300 in communication with a network controller 350, such as an enhanced Node B (eNB) or other base station. The network controller 350 and mobile device 300 establish communication channels such as the control channel 352 and the data channel 354, and exchange data. In this example, the mobile device 300 supports one or more Subscriber Identity Modules (SIMs), such as the SIM1 302 and the SIM2 304. Electrical and physical interfaces 306 and 308 connect SIM1 302 and SIM2 304 to the rest of the user equipment hardware, for example, through the system bus 310.

The example mobile device 300 includes communication interfaces 312, system logic 314, and a user interface 318. The system logic 314 may include any combination of hardware, software, firmware, or other logic. The system logic 314 may be implemented, for example, with one or more systems on a chip (SoC), application specific integrated circuits (ASIC), discrete analog and digital circuits, and other circuitry. In various implementations, the example mobile device 300 may perform various tasks of the device 102.

In some implementations, various tasks of the host system 101, discussed above, may be performed by the hardware of the mobile device 300. For example, the initiation of the multiple node exchange of selected values and causation of blockchain recordations may be performed by the mobile device 300. Although the device 102 and host system 101 may include various logically separable functions, the host system and device may not necessarily be run on physically separate hardware.

The system logic 314 is part of the implementation of any desired functionality in the mobile device 300. In that regard, the system logic 314 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 318.

The user interface 318 and the input/output (I/O) interfaces 328 may include a graphical user interface, touch sensitive display, voice or facial recognition inputs, buttons, switches, speakers and other user interface elements. Additional examples of the I/O interfaces 328 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interfaces 328 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The system logic 314 may include one or more processors 316 and memories 320. The memory 320 stores, for example, control instructions 322 that the processor 316 executes to carry out desired functionality for the mobile device 300. The control parameters 324 provide and specify configuration and operating options for the video capture application 322. The memory 320 may also store any BT, WiFi, 3G, or other data 326 that the mobile device 300 will send, or has received, through the communication interfaces 312. The mobile device 300 may include one or more cameras which may include an lighting device (e.g., LED or flash bulb) that may serve as a camera flash. The system power of the mobile device 300 may be supplied by a battery 301 or other power source.

In the communication interfaces 312, RF transmit (Tx) and receive (Rx) circuitry 330 handles transmission and reception of signals through one or more antennas 332. The RF Tx/Rx circuitry 330 may include baseband circuitry 335 to control the processing of transmitted and received signals. For example, the baseband circuitry may perform pre-distortion calibrations and pre-distort input signals for transmission. The communication interface 312 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 312 may include transceivers that support transmission and reception under the 2G, 3G, BT, WiFi, Universal Mobile Telecommunications System (UMTS), High Speed Packet Access (HSPA)+, and 4G/Long Term Evolution (LTE/LTE-A) standards. The techniques described below, however, are applicable to other wireless communications technologies whether arising from the 3rd Generation Partnership Project (3GPP), GSM Association, 3GPP2, IEEE, or other partnerships or standards bodies.

In some implementations, the mobile device 300 may connect to a network-connected display device 398, which may include lights or other outputs for representation of the random value.

Figure 4:
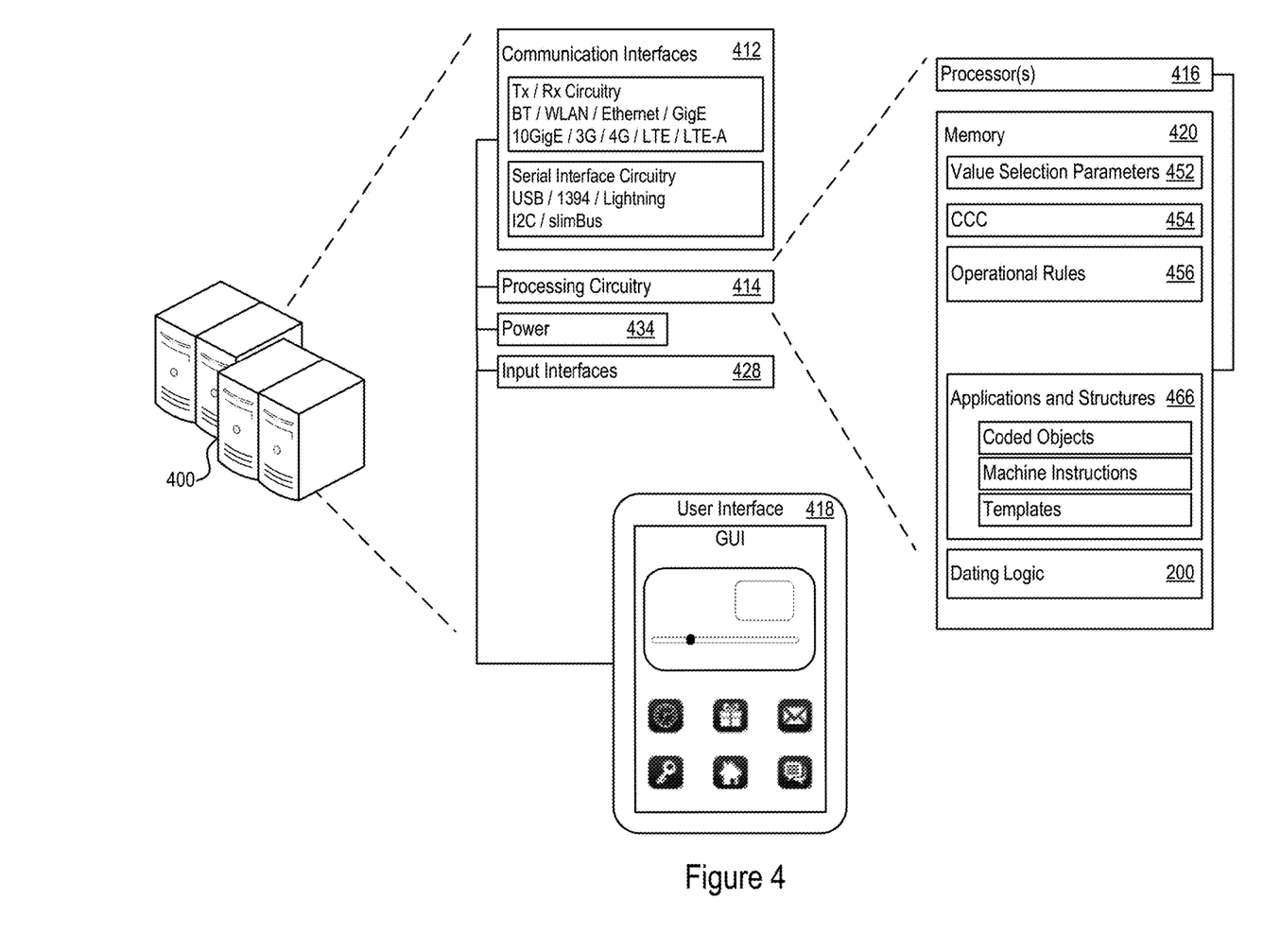
FIG. 4 shows an example execution environment 400 for a host system.

FIG. 4 shows an example execution environment 400 for the host system described above. The execution environment 400 may include processing circuitry 414 to support coordination of the random value selection, video capture, and blockchain recordation described above. The processing circuitry 414 may include processors 416, memory 420, and/or other circuitry. In various implementations, the execution environment may include a cloud, virtual machine, and/or serverless execution environment. In some cases, tasks of the may be performed distributed host system one or more nodes on a distributed network. The nodes may be coordinated by code supplied or provided on behalf the entity controlling the host system, e.g., as a portion of a smart contract. However, other localized, server-based, or distributed computing environments may be used. The instructions stored on the processing circuitry 414 (whether localized or distributed) transforms the processing circuitry 414 into a specifically configured machine in accord with some or all of the architectures and techniques discussed in this disclosure. In some distributed cases, the specific portion of the distributed hardware that may be executing the serverless tasks may change as execution progresses.

The memory 420 may include value selection parameters 452, capture coordination controls (CCC) 454, and operational rules 456. The memory 420 may further include applications and structures 466, for example, coded objects, machine instructions, templates, or other structures to support coordination of the random value selection, video capture, and blockchain recordation, or other tasks described above. The memory 420 may also include instructions to support the dating logic 200 discussed above.

The execution environment 400 may also include communication interfaces 412, which may support wireless, e.g. Bluetooth, Wi-Fi, WLAN, cellular (4G, LTE/LTE-A), and/or wired, Ethernet, Gigabit Ethernet, optical networking protocols. The communication interfaces 412 may also include serial interfaces, such as universal serial bus (USB), serial ATA, IEEE 1394, lighting port, I$^2$C, slimBus, or other serial interfaces. The communication interfaces 412 may be used to support and/or implement remote operation of the host system. The execution environment 400 may include power functions 434 and various input interfaces 428. The execution environment may also include a user interface 418 that may include human-to-machine interface devices and/or graphical user interfaces (GUI). The user interface 418 may be used to support and/or implement local operation of the host system. As discussed above, in various implementations, the processing circuitry 414 may be distributed over one or more physical servers, be implemented as one or more virtual machines, be implemented in container environments such as Cloud Foundry or Docker, and/or be implemented in serverless (functions as-a-service) environments.

In some cases, the execution environment 400 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the host system, of the execution environment onto the hardware resources. In some cases, a manifest may be stored as a preference file such as a YAML (yet another mark-up language), JSON, or other preference file type.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

Table 2 shows various examples that may use the techniques and architectures described above.

TABLE 2

Examples

1. In an example, a method includes:
    initiating a multiple node exchange of selected values, the
    multiple node exchange including combining the selected values
    to generate a random selection;
    causing a request to generate a first record of the exchange and
    the random selection on a blockchain;
    causing provision of the random selection to a device for capture
    of a video, the device configured to, during capture, cause
    representation of the random selection within the video; and
    causing a request to generate a second record of the video on the
    blockchain.
2. The method of example 1, where the first record comprises
    multiple parts generated in multiple selection rounds, where a
    second one of the multiple parts references a first one of the
    multiple parts.
3. The method of example 2, where the second one of the multiple
    parts is recorded on a selected block of the blockchain that is
    appended to the blockchain after a specific block that contains a
    record of the first one of the multiple parts.
4. The method of any of examples 1-3, where causing representation of the random selection comprises causing operation of a
    light on the device.
5. The method of any of examples 1-4, where causing representation
    of the random selection includes causing a display of words
    representing the random selection.
6. The method of any of examples 1-5, where causing representation
    of the random selection includes causing a network-connected
    device to produce audio and/or visual signals.
7. In an example, a method includes:
    initiating a multiple node exchange of selected values;
    combining the selected values to generate a random selection;
    recording a first record of the exchange and the random selection
    on a first blockchain;
    providing the random selection to a device for capture of a video;
    during capture, causing representation of the random selection
    within the video;
    receiving the video from the device; and
    recording a second record of the video on a second blockchain.

TABLE 2-continued

Examples

8. The method of example 7, where the first and second blockchain comprise the same blockchain.
9. The method of either example 7 or 8, where recording the first record of the exchange comprises recording the first record in multiple parts, where a second one of the multiple parts refers to a first one of the multiple parts.
10. The method of any of examples 7-9, where causing representation of the random selection comprises causing operation of a light on the device.
11. The method of any of examples 7-10, where causing representation of the random selection includes causing a display of words representing the random selection.
12. The method of any of examples 7-11, where causing representation of the random selection includes causing a network-connected device to produce audio and/or visual signals.
13. In an example, a product includes:
    machine readable media other than a transitory signal; and
    instructions stored on the media, the instructions configured to, when executed, cause a machine to:
    initiate a multiple node exchange of selected values, the multiple node exchange including combining the selected values to generate a random selection;
    cause a request to generate a first record of the exchange and the random selection on a blockchain;
    cause provision of the random selection to a device for capture of a video, the device configured to, during capture, cause representation of the random selection within the video; and
    cause a request to generate a second record of the video on the blockchain.
14. The product of example 13, where the first record comprises multiple parts generated in multiple selection rounds, where a second one of the multiple parts references a first one of the multiple parts.
15. The product of example 14, where the second one of the multiple parts is recorded on a selected block of the blockchain that is appended to the blockchain after a specific block that contains a record of the first one of the multiple parts.
16. The product of any of examples 13-15, where the instructions are configured to cause the machine to cause representation of the random selection by causing operation of a light on the device.
17. The product of any of examples 13-16, where causing representation of the random selection includes causing a display of words representing the random selection.
18. The product of any of examples 13-17, where causing representation of the random selection includes causing a network-connected device to produce audio and/or visual signals.
19. In an example, a method includes:
    using a mobile device:
    obtaining a random selection, the random selection recorded on a blockchain;
    capturing a video; and
    sending the video to a host node for recordation to the blockchain; and
    during capture of the video, causing generation of perceptible outputs for capture within the video, the perceptible signals configured to represent the random selection.
20. In an example, a method includes:
    initiating a multiple node exchange of selected values, the multiple node exchange including combining the selected values to generate a random selection;
    causing a request to generate a first record of the exchange and the random selection on a blockchain;
    obtaining data created in accord with the random selection, selected in accord with the random selection, or both; and
    causing a request to generate a second record based at least in part on the data on the blockchain.
21. In an example, a method includes:
    initiating a multiple node exchange of selected values;
    combining the selected values to generate a random selection;
    recording a first record of the exchange and the random selection on a first blockchain;
    providing the random selection to a device for capture of a video;
    during capture, causing representation of the random selection within the video;
    receiving the video from the device; and
    recording a second record of the video on a second blockchain.
22. The method of example 1, where the first and second blockchain comprise the same blockchain.
23. The method of either of examples 1 or 2, where recording the first record of the exchange comprises recording the first record in multiple parts, where a second one of the multiple parts refers to a first one of the multiple parts.
24. The method of example 3, where the second one of the multiple parts is recorded on a block of the first blockchain that is appended to the blockchain after the block that records the first one of the multiple parts.
25. The method of any of examples 1-4, where causing representation of the random selection comprises causing operation of a light on the device.
26. The method of any of examples 1-5, where causing representation of the random selection includes causing a display of words representing the random selection.
27. The method of any of examples 1-6, where causing representation of the random selection includes causing a network-connected device to produce audio and/or visual signals.
28. In an example, a method includes integrating a date verifiable random value selection into a video during capture.
29. The product of any of examples 13-17, where multiple node exchange includes an operation compelling a first node of multiple exchanging nodes to commit to a corresponding selected value prior to a second node of the multiple exchanging nodes revealing a respective selected value for the second node.
30. In an example, a method performed by executing the instructions of any of examples 13-18 and 29.
31. In an example, a system includes circuitry configured to perform any of the methods of examples 1-12, 19-28, and 30.
32. In an example, a product includes:
    a machine readable medium other than a transitory signal; and
    instructions stored on the medium that when executed cause a system to perform any of the methods of examples 1-12 and 19-28.
33. In an example, a system is configured to implement any of or any combination of the features described in the preceding specification and examples.
34. In an example, a method includes implementing any of or any combination of the features described in the preceding specification and examples.

Various implementations have been specifically described. However, many other implementations are also possible.

What is claimed is:

1. A method including:
    obtaining, via a distributed network source, a date-verifiable random value;
    causing a request to generate a first record of the date-verifiable random value on a blockchain;
    causing provision of the date-verifiable random value to a device for capture of a video, the device configured to, during capture, cause representation of the date-verifiable random value within the video; and
    causing a request to generate a second record of the video on the blockchain.

2. The method of claim 1, where causing representation of the date-verifiable random value comprises causing operation of a light on the device.

3. The method of claim 1, where causing representation of the date-verifiable random value includes causing a display of words representing the date-verifiable random value.

4. The method of claim 1, where causing representation of the date-verifiable random value includes causing a network-connected device to produce audio and/or visual signals.

5. The method of claim 1, where:
    the distributed network source includes the blockchain; and obtaining the date-verifiable random value includes hashing data stored on the blockchain.

6. The method of claim 5, where the data is generated via interaction between multiple nodes of a distributed network of the blockchain.

7. The method of claim 5, where the data includes at least a portion of a block on the blockchain.

8. A method including:
   causing, via a first blockchain, determination of a date-verifiable random value;
   causing provision of the date-verifiable random value to a device for capture of a video;
   during capture, causing representation of the date-verifiable random value within the video;
   causing a request to generate a record of the video on a second blockchain.

9. The method of claim 8, where the first and second blockchain comprise the same blockchain.

10. The method of claim 8, where causing representation of the date-verifiable random value comprises causing operation of a light on the device.

11. The method of claim 8, where causing representation of the date-verifiable random value includes causing a display of words representing the date-verifiable random value.

12. The method of claim 8, where causing representation of the date-verifiable random value includes causing a network-connected device to produce audio and/or visual signals.

13. The method of claim 8, where causing determination of the date-verifiable random value includes causing generation of a hash of data stored on the first blockchain.

14. The method of claim 13, where the data is generated via interaction between multiple nodes of a distributed network of the first blockchain.

15. The method of claim 13, where the data includes at least a portion of a block on the first blockchain.

16. A product comprising:
   machine readable media other than a transitory signal; and
   instructions stored on the media, the instructions configured to, when executed, cause a machine to:
     causing, via a first blockchain, determination of a date-verifiable random value;
     causing provision of the date-verifiable random value to a device for capture of a video;
     during capture, causing representation of the date-verifiable random value within the video;
     causing a request to generate a record of the video on a second blockchain.

17. The product of claim 16, where causing representation of the date-verifiable random value includes causing a network-connected device to produce audio and/or visual signals.

18. The product of claim 16, where causing determination of the date-verifiable random value includes causing generation of a hash of data stored on the first blockchain.

19. The product of claim 18, where the data is generated via interaction between multiple nodes of a distributed network of the first blockchain.

20. The product of claim 19, where the data includes at least a portion of a block on the first blockchain.

* * * * *